Figure 1:
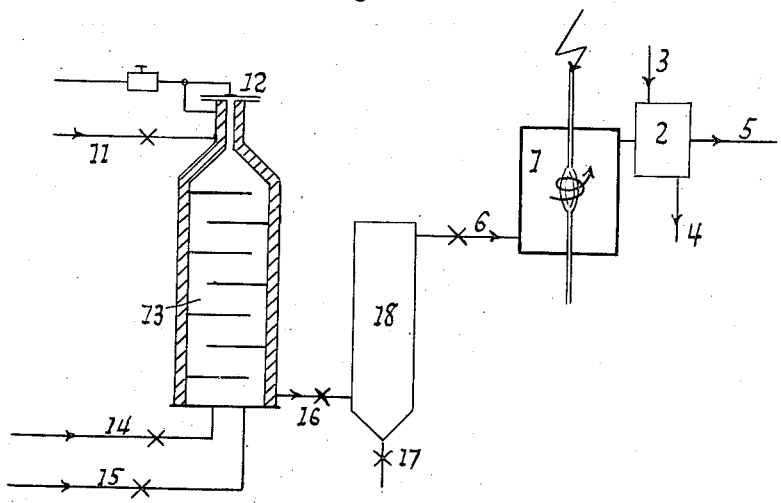

Dec. 18, 1934.   P. BAUMANN ET AL   1,984,957
PRODUCTION OF ACETYLENE
Filed Aug. 23, 1930    2 Sheets-Sheet 1

Paul Baumann
Robert Stadler
Heinrich Schilling
Hanns Bueckert
INVENTORS

BY ATTORNEYS

Dec. 18, 1934.   P. BAUMANN ET AL   1,984,957
PRODUCTION OF ACETYLENE
Filed Aug. 23, 1930   2 Sheets-Sheet 2
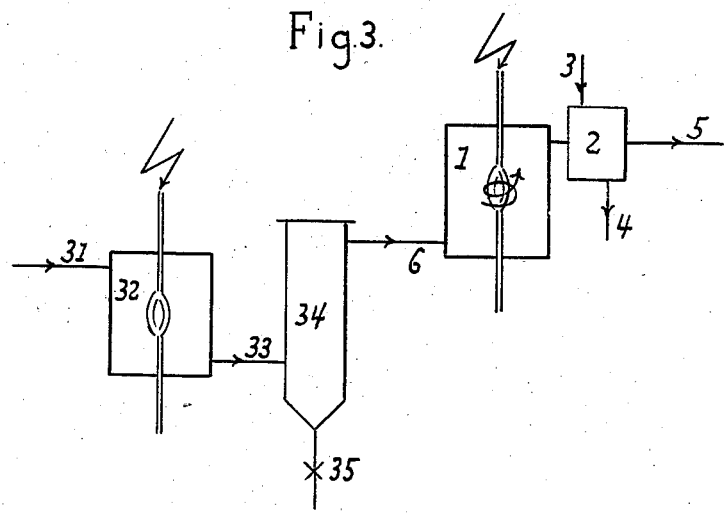
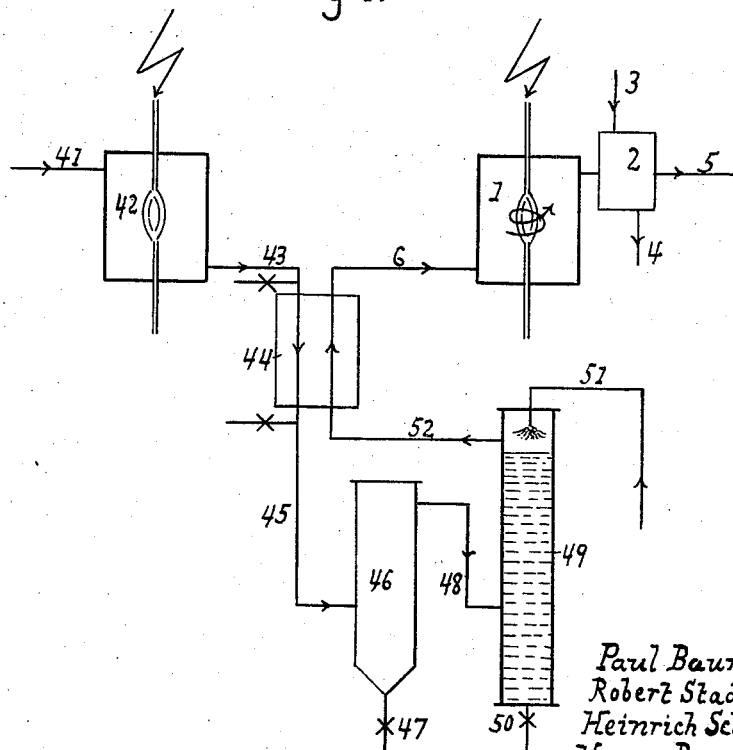
Paul Baumann
Robert Stadler
Heinrich Schilling
Hanns Bueckert
INVENTORS
BY ATTORNEYS Patented Dec. 18, 1934

1,984,957

UNITED STATES PATENT OFFICE 1,984,957

PRODUCTION OF ACETYLENE

Paul Baumann, Ludwigshafen - on - the - Rhine, Robert Stadler, Ziegelhausen, and Heinrich Schilling and Hanns Bückert, Ludwigshafen-on-the-Rhine, Germany, assignors to I. G. Farbenindustrie Aktiengesellschaft, Frankfort-on-the-Main, Germany Application August 23, 1930, Serial No. 477,380
In Germany March 25, 1930

4 Claims. (Cl. 204—31)

The present invention relates to the production of acetylene from hydrocarbons or gases containing the same by the electric arc treatment.

In the manufacture and production of acetylene by the treatment of hydrocarbons, such as methane or ethane, or gases containing the same in the electric arc only small yields of acetylene are obtained.

We have now found that in the production of acetylene from gaseous or volatilized liquid hydrocarbons such as methane or ethane or gases containing such hydrocarbons, which materials are hereinafter referred to as gases comprising hydrocarbons, in the electric arc the small yields usually obtained are to a high degree due to conversions taking place in the still hot gas mixtures leaving the electric arc and that the said conversions can be prevented to a large extent and much better yields of acetylene are obtained by cooling down as quickly as possible the gases leaving the electric arc. This kind of cooling is hereinafter referred to as "chilling". Since, however, carbon is easily formed in the treatment by the electric arc especially when gases having a high concentration of hydrocarbons are employed as initial materials, which carbon may soon clog the cooling passages through which the treated gases flow, thus rendering a continuous working and efficient cooling impossible, it is preferable to use as initial materials for the acetylene-producing arc treatment gases containing an appreciable amount of hydrogen, for example gases which have a content of up to 50 per cent of hydrogen reckoned on the content of hydrocarbons present in the gases. Furthermore it is advantageous to supply the initial materials to the electric arc in a preheated state. For this purpose it has been proposed to cause the products leaving the electric arc to exchange heat with the fresh initial materials. Since, however, working in this manner provides only for a very slow cooling down and necessitates maintaining the products leaving the electric arc at considerable temperatures for a long time, these products frequently undergo undesirable conversions with the formation of by-products, especially carbon, so that the advantage gained by the exchange of heat is rendered doubtful by the said objection. Therefore it is necessary to supply the required heat for preheating the gases to be treated by special means.

According to the present invention this preheating may be effected directly or indirectly. According to one modification of the present invention hot gases containing hydrocarbons are supplied to the electric arc the heat content of which gases has been wholly or partly produced by a previous different chemical conversion by which, in case the initial materials for this conversion contain the initial hydrocarbons for the production of acetylene at least part of these hydrocarbons is left unaltered, or by which the initial hydrocarbons for the production of acetylene are formed. The said conversion may be effected by a previous arc treatment, for example by an arc treatment for preparing carbon black or any other different chemical treatment. A special advantage of the process according to the present invention consists in the fact that the further working up of the acetylene obtained, as for example into acetaldehyde, proceeds very smoothly since this acetylene is to a large extent free from the impurities which are formed as by-products in the known method of preheating by heat exchange of the fresh gas with the hot electric arc gases, such as diacetylene, allylene and the like.

The process according to the present invention may be carried out for example by supplying the electric arc with a hot mixture of methane and hydrogen obtained in the manufacture of carbon black by the thermal decomposition of methane in a Cowper apparatus or in an electric arc immediately after leaving said devices. The preparation of the acetylene may also be combined with processes for the working up of methane or the like which make use of exothermic reactions. Thus for example the hot gas mixture still containing methane obtained in the preparation of hydrogen from natural gas by partial combustion may be employed as the initial material. Furthermore, gas mixtures obtained by the hydrogenation of a gas mixture containing carbon monoxide for the synthesis of methane are also suitable.

The nature of the invention will be further explained by the following examples and with reference to the accompanying drawings which show diagrammatically in vertical section arrangements of apparatus according to this invention, but the invention is not restricted either to the examples or to the specific arrangements illustrated in the drawings. Figures 1, 2, 3 and 4 are with reference to Examples 1, 2, 3 and 4 respectively.

*Example 1*

A gas mixture having a content of about 91 per cent of methane is led by pipe 11 shown in Figure 1 into the Cowper apparatus 13 heated to a temperature of about 1200° C., in which it is subjected to thermal decomposition. The Cowper apparatus is heated beforehand by means of a heating gas supplied by pipe 15 burnt with air which is supplied by pipe 14. The heating gases leave the Cowper apparatus at 12. By the said thermal decomposition the initial gas is converted to form a mixture consisting substantially of equal parts of methane and hydrogen with the formation of carbon black. This mixture having a temperature of from 500° to 700° C. leaves the Cowper apparatus at 16 and is led into a vessel 18 in which any dust of carbon black carried off is deposited and removed at 17. From thence the said mixture is supplied by pipe 6 at about the same temperature of from 500° to 700° C. to the electric arc furnace 1 constructed on the principle of the known Schönherr furnace where it is subjected to an arc having a power of about 100 kilowatts. The gas leaving the electric arc is then passed into the cooler 2 through narrow passages the outer surfaces of which are continuously contacted with a fresh cooling medium, for example water, supplied at 3 and taken off at 4. The gases containing acetylene which are thus chilled, are withdrawn at 5. Acetylene is thus obtained in a yield of 80 litres per kilowatt hour.

*Example 2*

Figure 2:
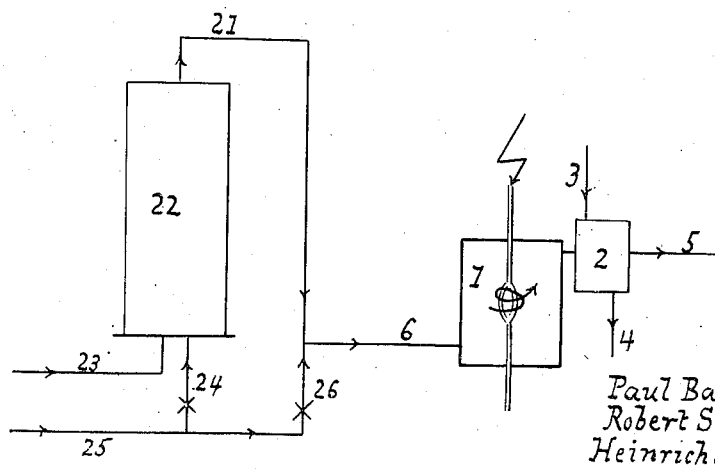

Methane is supplied by pipes 25 and 24 into the furnace 22 shown in Figure 2 in which it is subjected at about 1000° C. to a partial combustion effected by means of oxygen led in by pipe 23 into the furnace 22 in an amount of about 0.6 cubic metre of oxygen for each cubic metre of methane. A gas mixture having a temperature of about 1000° C. is withdrawn at 21 which in addition to small amounts of carbon dioxide and steam contains mainly carbon monoxide and hydrogen. This very hot gas is mixed with the same amount of methane supplied by pipe 26 and then, while having a temperature of about 500° C., is passed into the electric arc furnace 1, in which it is subjected to an electric arc having a power of about 100 kilowatts, the resulting gas mixture is then passed through the cooler 2 in the manner described in Example 1. At 5 a gas is withdrawn containing acetylene in a yield of 85 litres per kilowatt hour.

*Example 3*

A gas containing 90 per cent of methane is passed through pipe 31 into the electric arc furnace 32 shown in Figure 3, in which it is subjected to an electric arc produced by an alternating current and having a power of about 500 kilowatts, for the production of carbon black. The gas is then passed through pipe 33 into the chamber 34 in which it is freed from its content of carbon black. In this manner 60 kilograms of carbon black which may be collected at 35 are obtained from each 400 cubic metres of initial gas. The remaining hot gases contain about 50 per cent of methane and about 4 to 5 per cent of unsaturated hydrocarbons and a little acetylene. This hot gas mixture having a temperature of about 500° C. is then passed by pipe 6 into another electric arc furnace 1, in which it is subjected to the action of an electric arc having a power of 500 kilowatts, substantially no carbon black being produced in this stage.

The resulting gas mixture is then passed through the cooler 2 in the manner described in Example 1. A yield of 90 to 100 litres of acetylene per kilowatt hour is obtained from the gas withdrawn at 5.

*Example 4*

A gas mixture containing about 60 per cent of methane, 20 per cent of ethane and 20 per cent of propane is supplied by pipe 41 into the electric arc chamber 42 (Figure 4) in which it is subjected to the action of an electric arc having a power of 100 kilowatts for the production of carbon black. 7.5 kilograms of carbon black are thus obtained from each 80 cubic metres of initial gas which are deposited in the carbon black collecting chamber 46. The remaining gas contains about 45 per cent of methane, 12 per cent of unsaturated hydrocarbons and 6 to 8 per cent of acetylene. This gas mixture is led together with the carbon black contained therein by way of pipe 43 to the heat exchanging chamber 44 and from thence, by way of pipe 45 into the carbon black collecting chamber 46 and by way of pipe 48 to the washing tower 49 in which the gas mixture is substantially freed from acetylene and other unsaturated constituents by washing it with a suitable solvent, for example, acetone, fed in by pipe 51. The remaining gas mixture leaving the said tower by pipe 52 consists now substantially of methane and hydrogen. It is passed through the heat exchanger 44, in which it is preheated to about 600° C. and from thence supplied by way of pipe 6 to the electric arc furnace 1 in which it is subjected to the action of an electric arc having a power of 100 kilowatts. The resulting gas mixture is then passed through the cooler 2 in the manner described in Example 1. A yield of 80 to 90 litres of acetylene per kilowatt hour is obtained from the gas leaving the cooler 2 at 5.

What we claim is:—

1. In the production of acetylene from gases comprising hydrocarbons by the electric arc treatment, the step which comprises effecting at least a partial preheating of a gas comprising hydrocarbons by subjecting it at an elevated temperature to a chemical conversion which is different from the conversion into acetylene by an electric arc treatment and in which at least part of the hydrocarbons is left unaltered, subjecting the gas resulting from the said conversion while still hot to the acetylene-producing electric arc treatment and chilling the gases leaving the electric arc.

2. In the production of acetylene from gases comprising hydrocarbons by the electric arc treatment, the steps which comprise subjecting a gas comprising hydrocarbons to an electric arc treatment in which part of the initial gas comprising hydrocarbons is converted into a product predominantly containing carbon black with only small amounts of acetylene thereby producing a hot gas comprising hydrocarbons and hydrogen, supplying this gas, while still hot, to another electric arc for producing a product predominantly acetylene and chilling the gas leaving the last electric arc.

3. In the production of acetylene from gases comprising hydrocarbons by the electric arc treatment, the step which comprises preheating a gas comprising hydrocarbons by subjecting it to a heat producing chemical conversion, different from the conversion into acetylene by an electric arc treatment and in which at least part of the hydrocarbons is left unaltered, mixing the resulting hot gases with cold gas comprising hydrocarbons, subjecting the gas mixture to the electric arc treatment and chilling the gases leaving the electric arc.

4. In the production of acetylene from gases comprising hydrocarbons by the electric arc treatment, the step which comprises subjecting a gas comprising hydrocarbons to an electric arc treatment producing carbon black from part of the initial gas, removing from said gas the carbon black and the unsaturated hydrocarbons formed in said treatment, preheating the resulting gases by indirect heat exchange with the gas leaving the said electric arc, supplying it to an electric arc for producing acetylene, and chilling the gas leaving the last electric arc.

PAUL BAUMANN.
ROBERT STADLER.
HEINRICH SCHILLING.
HANNS BÜCKERT.